United States Patent Office 3,474,677
Patented Oct. 28, 1969

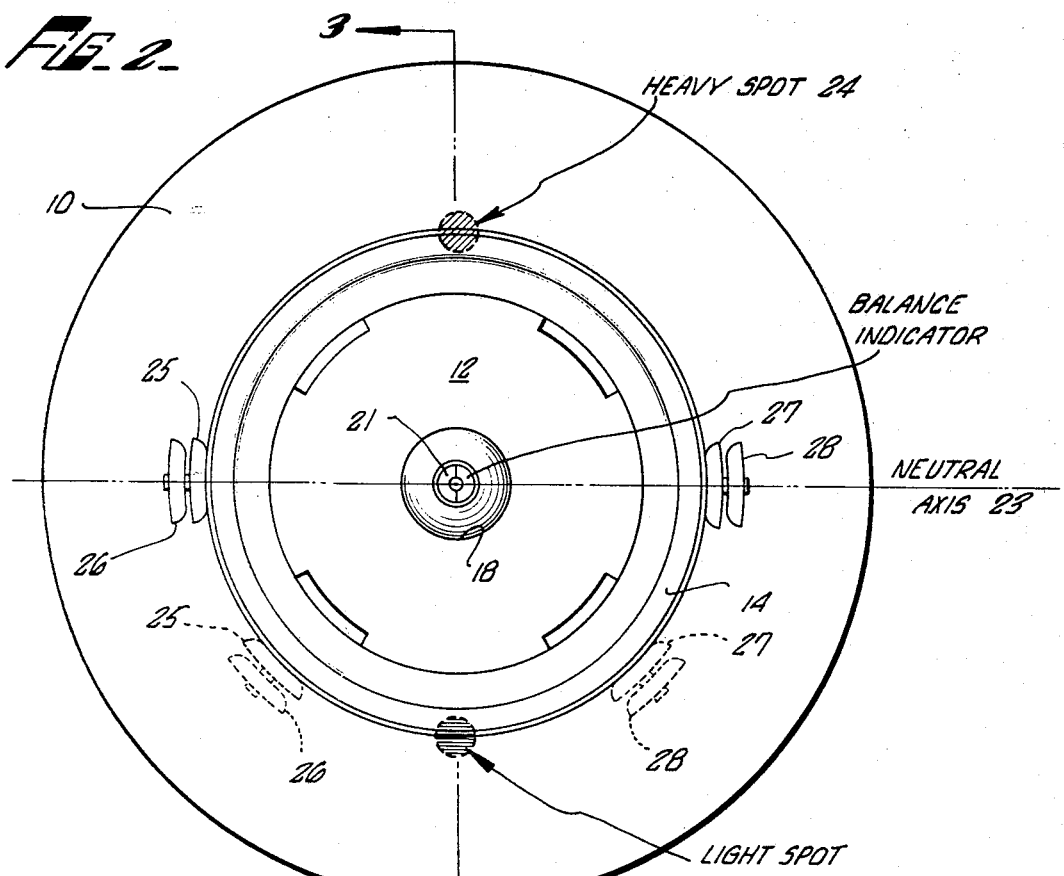
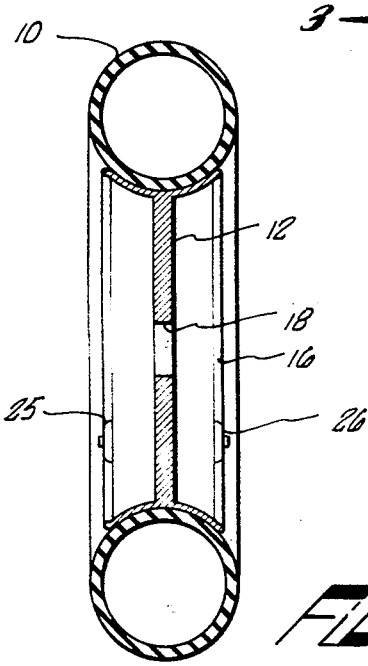
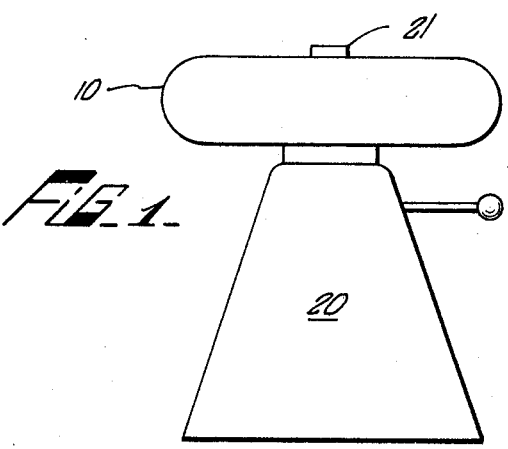

3,474,677
WHEEL BALANCE METHOD
Norman M. Roe, Granada Hills, Calif., assignor to The Bada Company, Pasadena, Calif., a corporation of California
Filed Nov. 16, 1966, Ser. No. 594,940
Int. Cl. G01m 1/02, 1/30
U.S. Cl. 73—483                  1 Claim

ABSTRACT OF THE DISCLOSURE

A method of balancing automotive wheels in which a wheel to be balanced is placed horizontally upon a balancing machine, such as a "bubble balancer," capable of indicating with accuracy the light spot of the wheel at which added balance weights are most effective to balance the wheel. Provide at least two and optimally three sets of four balance weights, the weight in each set being of squal mass and increasing in mass in selected increments from set to set. One set of weights is placed on the rim of the wheel in pairs diametrically opposed to each other equidistantly from the wheel light spot, and the pairs are moved symmetrically toward the light spot along the wheel rim until a condition of wheel balance is achieved. Then one weight of each pair is connected to the wheel rim on the one side of the wheel at that location corresponding to the adjusted position of the pair at the time of balance, and the other weight is connected to the other side of the wheel at a corresponding position. If the first set of weights has insufficient mass to produce balance, the adjustment procedure is repeated with the second and, if necessary, the third sets of weights.

---

This invention relates to a method for balancing vehicle wheels, and has particular reference to a four-weight method for statically balancing wheels on a pivot point wheel balancing machine without upsetting the dynamic balance of the wheel.

Pivot point balancing machines are well known and are commonly found in filling stations and automobile service centers where wheel balancing services are offered to the public. The general concept is that when an automobile wheel, having a tire mounted to it, is placed at rest horizontally on the pivot point machine, any static unbalance of the wheel will cause it to deviate from the horizontal, as indicated by a bubble (spirit) level on the machine. Conventionally, the wheel is statically balanced by the application of one or more small lead weights, called wheel weights or rim weights, to the rim of the wheel in a manner which causes the wheel to return to a horizontal plane and the bubble to center within the level. The place on the wheel at which the weight or weights should be applied is indicated in a general way by observing the highest point on the wheel rim when it is tilted from the horizontal by its unbalanced condition, this highest point being referred to as the "light spot" or "point of maximum effectiveness" of applied wheel weights. The light spot can also be located more accurately by observing the direction in which the bubble of the level is displaced from the center of the level. Each rim weight essentially is a piece of alloyed lead having a small steel clamp formed integrally with the weight. The clamp snaps over the rim of the wheel when hit by a hammer.

This invention provides a method of balancing an automobile wheel on the type of machine described above with great accuracy yet without disturbing the dynamic balance of the wheel; practice of the method, in the vast majority of cases, reduces the effects of dynamic unbalance. Adherence to the method described herein eliminates entirely the inaccurate, inadequate and detrimental results of balancing procedures relying upon a single weight to achieve wheel balance; single-weight procedures require the maintenance of a large inventory of a large number of different weights which vary progressively in size. Single-weight procedures inherently are ineffective to correct all unbalance conditions encompassed by the multiple weight inventory, and such practices obviously change the dynamic balance of the wheel. The present method has no "gaps" relative to unbalance conditions below unbalance conditions which are so severe as to require corrective procedures going beyond the scope of techniques relying solely upon the addition of weight to the wheel. Also, the use of the present method reduces to a minimum the number of different weights which must be stocked to enable the balancing of the vast majority of unbalanced wheels. The method is characterized by its simplicity and reliability.

United States Patent 3,002,388, owned by the assignee of the present invention, describes another four-weight method which is also effective to balance wheels efficiently. While the procedure described in this patent may result in a quicker balance than the practice of the present method, this invention absolutely eliminates any possible chance that a wheel susceptible of being balanced by the addition of weights will not be properly balanced.

Briefly, the present method includes the steps of positioning a wheel to be balanced, including a tire mounted to the wheel, horizontally upon a wheel balancing machine and measuring, with a high degree of accuracy, any deviation of the plane of the wheel from the horizontal, thereby to locate the point on the wheel adjacent the rim of maximum balancing effectiveness of balancing weights applied to the wheel. The method also comprehends placing a set of four balancing wheel weights of selected and equal mass on one rim of the wheel and arranging the weights in two pairs of weights diametrically opposed to each other across the wheel and on opposite sides of and equidistantly from the point of maximum effectiveness. The weights are then adjusted, in pairs, symmetrically along the wheel rim toward the point of maximum effectiveness from their diametrically opposed initial positions. When a condition of balance is obtained, i.e., when the wheel returns to a horizontal position, one weight of each pair is connected to the wheel rim at the adjusted position of the pair. The other weight of each pair is then secured to the wheel rim at the other side of the wheel at a position approximately corresponding to the circumferential position on the wheel of its mate.

The above-mentioned and other features of the invention are more fully set forth in the following description of the invention, which description is presented with reference to the accompanying drawings, wherein:

FIG. 1 is a schematic elevation view of an automobile wheel resting on a conventional pivot point balancing machine;

FIG. 2 is a top plan view of the wheel on the machine; and

FIG. 3 is a schematic elevation view taken along line 3—3 of FIG. 2 showing the placement of rim weights on opposite sides of the wheel.

FIGS. 1 to 3 illustrate an automobile wheel having a tire 10 mounted on a wheel 12. The wheel has an outboard rim portion 14, an inboard rim portion 16, and a central aperture 18. The wheel rests on a conventional wheel balancing machine 20.

An upper portion of the balancing machine, which includes a balance indicator 21 usually in the form of a circular bubble level, extends through the central aperture of the wheel.

When the wheel is placed on the machine so that the plane of the wheel is in a horizontal position, any static unbalance of the wheel will cause the plane of the wheel to deviate from the horizontal. By observing the bubble level and the tilting of the wheel, the highest point of the wheel can can be readily ascertained. This point is usually referred to as the "light spot" and is the theoretical position on the rim of the wheel where the application of a single weight of suitable size will bring the wheel into a perfect static balance such that the wheel returns to a horizontal position and the bubble of the level indicator returns to the center of the level. The light spot is indicated in FIG. 2 by dotted circle 22. The wheel, theoretically, is divided into a heavy side and a light side by a neutral axis 23; the application of equal weights to the wheel at diametrically opposed locations along the neutral axis has no effect upon the static unbalance of the wheel. The wheel can be considered to possess a heavy spot 24 diametrically opposite from the light spot.

To balance wheel/tire combination 10, 12 according to this invention, a set of four rim weights 25, 26, 27, 28 are placed upon the upper surface of the wheel on the tire just adjacent wheel rim portion 14. Weights 25–28 comprise one of at least two, and preferably three different sets of available weights and preferably is the least massive set of weights. Weights 25–28 are of equal size and weight. The weights are placed adjacent the wheel rim in pairs 25, 26 and 27, 28 disposed at diametrically opposed locations along neutral axis 23, i.e., equidistantly from and on opposite sides of light spot 22. The light set of weights is used initially to assure that the tire will in fact be balanced if it can be balanced satisfactorily merely by the connection of rim weights to the wheel.

The balancing process is carried out by adjusting weight pairs 25, 26 and 27, 28 symmetrically toward each other and the light spot along the wheel rim. As such movement occurs, the weights become increasingly effective to balance the heavy spot on the opposite side of the neutral axis. This adjustment of the position of the two pairs of weights continues until the wheel is balanced; this state is indicated by the wheel assuming a horizontal attitude. The position of weights 25–28 effective to balance the wheel is depicted by the dotted line representation of the weights in FIG. 2. When the required adjustment of the weights is achieved, weights 25 and 27 are connected to wheel rim portion 14 adjacent, i.e., radially of the adjusted positions of these weights at equal distances from the light spot; weights 26 and 28 are secured to rim portion 16 at locations opposite from weights 25 and 27, respectively, i.e., at the same distance from the light spot as weights 25 and 27, respectively.

To achieve the best possible balance, however, it is preferred that weights 26 and 28 be secured to the inboard rim of the wheel before weights 25 and 27 are secured to the outboard rim. To accomplish this most efficiently, the adjusted positions of the weight pairs are marked on the tire tread with chalk, the wheel is removed from the balancing machine, and weights 26 and 28 are applied to the inboard rim adjacent the chalk marks. The wheel is then returned to the balancing machine and the machine is used to provide a confirmatory indication of the perfectness of the balance when weights 25 and 27 are returned to their adjusted positions on the wheel. If weights 26 and 28 were not secured to the wheel at exactly the proper positions, the balancing machine indicates this fact. It is necessary, then, to adjust weight 25 and 27 only slightly along the wheel rim to achieve perfect static balance of the wheel.

If, however, the first and lightest set of weights applied to the wheel must be moved to the light spot and still the wheel is unbalanced, then the next heaviest set of weights provided is selected and is placed in pairs on the wheel at opposed locations along the neutral axis. The symmetrical adjustment process is then repeated until a balanced condition of the wheel is produced. The four weights are then secured to the inboard and outboard rim portions of the wheel in the manner described above. If all the weights of the second set can all be gathered at the light spot without overbalancing the wheel, the third set of four equal weights is selected and the above-described procedure is repeated.

The weights of the second set of weights are sized so that when they are located in pairs on the wheel just toward the light spot from the neutral axis, they exert the same balancing effect upon the wheel as do all four weights of the first set when collected at the light spot. The weights of the third set are sized in a similar manner relative to the weights of the second set.

If all four weights of the third and heaviest set of weights can be collected at light spot 22 without balancing or overbalancing the wheel (a rare condition), it is known then that the wheel cannot properly be balanced merely by adding balance weights to the wheel; to balance such a severely unbalanced wheel, it is best to rotate the tire about 180 degrees on the wheel and to recommence the above-described procedure.

To assure the best possible balance, the minimum amount of weight should be added to the wheel. The procedure described assures, consistent with the competing consideration that a minimum stock of weights should be inventoried for economic reasons, that the least possible weight is applied to an unbalanced wheel to achieve balance, and this is also economically important. Also, the procedure described assures that the wheel will be balanced if it can in fact be balanced safely, that is, the procedure described does not skip any weight arrangement effective to balance the wheel as is the case with procedures which rely upon a single weight to perfect balance. Because the weights used to accomplish balance are equally distributed on opposite sides of the wheel, the dynamic balance of the wheel is essentially undisturbed and the effect of any dynamic unbalance in the wheel is reduced in the vast majority of cases.

What is claimed is:

1. A method for balancing an automobile wheel having a tire mounted thereto comprising the steps of positioning the wheel horizontally on a wheel balancing machine, measuring with a high degree of accuracy any deviation of the plane of the wheel from the horizontal thereby to locate the point on the wheel adjacent the rim thereof of maximum balancing effectiveness of balancing weights applied to the wheel, providing, first, second and third sets of balancing rim weights each consisting of four weights of equal value, the weights increasing in value in selected increments from set to set, the weights of the second set being sized so that when they are disposed in pairs on the wheel just toward the point of maximum effectiveness from diametric opposition to each other equidistantly from and on opposite sides of said point they exert upon the wheel substantially the same balancing effect as do all four weights of the first set when collected at said point and arranged substantially as they would be secured to the wheel, the weights of the third set being sized relative to the weights of the second set as the weights of the second set are sized relative to the weights of the first set, placing the first set of weights adjacent the rim of the wheel and arranging the weights in two pairs of weights disposed equidistantly from and on opposite sides of said point of maximum effectiveness and just toward said point from diametric opposition to each other, adjusting said pairs of weights symmetrically along the wheel rim toward the point of maximum effectiveness from their initial positions to balance the wheel, removing the first weight set from the wheel and repeating the placing and arranging step and the adjusting step with the second weight set if the first weight set is ineffective to produce a condition of balance when the weights thereof are collected at the point of maximum effectiveness, removing the second weight set from the wheel and repeating the placing and arranging step and the adjusting step with the third weight set if the second weight set is ineffective to produce a condition of balance when the weights thereof are collected at the point of maximum effectiveness, and connecting the two weights of the set which produces balance to one rim of the wheel and the one weight of the same set to the other rim of the wheel at positions relative to the point of maximum effectiveness corresponding to the positions of the respective weights at the time balance is produced.

References Cited

UNITED STATES PATENTS

| 2,592,804 | 4/1952 | Holl | 73—484 |
| 2,697,345 | 12/1954 | Currier | 73—487 |
| 3,002,388 | 10/1961 | Bageman | 73—483 |
| 3,272,015 | 9/1966 | Behm | 73—487 XR |

JAMES J. GILL, Primary Examiner